United States Patent [19]
Shelton

[11] Patent Number: 4,584,061
[45] Date of Patent: Apr. 22, 1986

[54] VACUUM DESALINIZATION DEVICE

[76] Inventor: Robert E. Shelton, 4510 S.W. 34 Dr., Ft. Lauderdale, Fla. 33312

[21] Appl. No.: 688,317

[22] Filed: Jan. 2, 1985

[51] Int. Cl.$^4$ ............................................. B01D 3/10
[52] U.S. Cl. .................... 202/185.6; 202/197; 202/202; 202/205; 202/234; 203/2; 203/11; 203/100; 203/DIG. 4; 203/DIG. 14; 203/DIG. 24
[58] Field of Search ............... 202/189, 190, 176, 197, 202/187, 185.1, 205, 202, 234, 235, 266, 160, 182, 185.6; 203/11, 100, DIG. 14, DIG. 22, 2, DIG. 17, 10, DIG. 4, DIG. 24; 159/DIG. 26

[56] References Cited

U.S. PATENT DOCUMENTS

| | | | |
|---|---|---|---|
| 2,167,028 | 7/1939 | McGovern | 202/189 |
| 2,352,069 | 6/1944 | Beline | 203/DIG. 17 |
| 2,934,477 | 4/1960 | Siegfried | 203/11 |
| 3,393,130 | 7/1968 | Meckler | 202/187 |
| 3,489,649 | 1/1970 | Weiss | 202/197 |
| 3,553,084 | 1/1971 | Creskoff | 203/2 |
| 3,834,994 | 9/1974 | Peter | 203/11 |
| 4,096,039 | 6/1978 | Carnine et al. | 203/11 |
| 4,312,710 | 1/1982 | Tanaka et al. | 202/197 |
| 4,334,961 | 6/1982 | Moen et al. | 202/197 |

*Primary Examiner*—Wilbur Bascomb
*Attorney, Agent, or Firm*—John Cyril Malloy

[57] ABSTRACT

A desalinization device including a portable, spherical tank with conduits to introduce water to be converted into steam in the lower zone of the tank and guide structure to guide the steam into a condensate bowl within the tank where it is collected; the device also includes a conduit means to conduct cooling water to a cooling coil arranged in the condensate bowl to condense the steam; and within the conduits there is provided a Venturi arrangement in communication with the interior of the tank to reduce the pressure within the tank, hence lowering the boiling point of the water being heated; in a preferred embodiment Peltier devices are included as heat exchanging means in a heating and cooling circuit.

8 Claims, 7 Drawing Figures

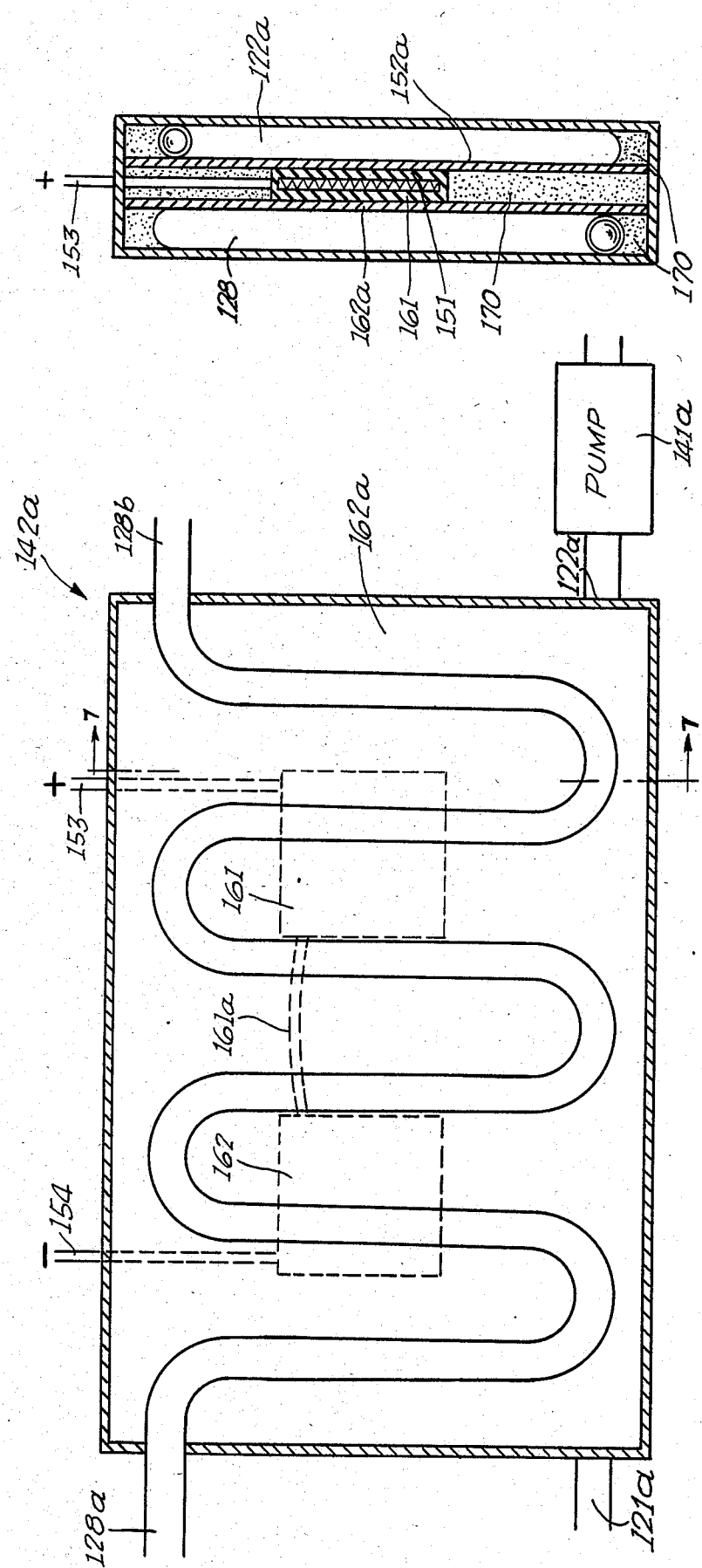

VACUUM DESALINIZATION DEVICE

FIELD OF THE INVENTION

This invention is of a desalinization device which is portable and suitable for use onboard vessels which lack ability to store and carry a sufficient supply of fresh, potable, pure water to sustain life, such as on a small sailing ship.

BACKGROUND OF THE INVENTION

In the past there have been numerous types of desalinization devices. This invention is of a relatively portable small generally spherical shape desalinization device. Preferably it is small in size and light in weight weighing approximately 10 pounds and utilizes little electrical energy to deliver approximately 3 to 5 gallons of water per hour. A 12 volt battery may be used.

The device is shown in two embodiments. In the first device, a hollow sphere of durable plastic is provided in which conduits are utilized to heat a flow of water to convert another flow of water delivered to the sphere into steam where it is condensed in the presence of a partial vacuum which lowers the boiling temperature and pressure. The condensate or distilled water is delivered to a storage unit. The water being heated may be heated by the exhaust energy from the engine of the vessel on which it is installed or, alternatively, electrically. In the alternative embodiment, a thermo-electric device is utilized to heat the water and preferably a Peltier which is a commercially available product of the Melcor Company, 990 Spruce Street, Trenton, N.J. 06648. It consists of a first and second plate sandwiched about an electronic circuit as described more fully hereinafter.

OBJECTS OF THE INVENTION

It is an object of this invention to provide a portable, relatively small desalinization device capable of delivering 3 to 5 gallons of distilled water per hour and which is especially useful on small marine craft or other places where fresh water is needed or desired.

It is an object of this invention to provide a portable lighweight desalinization unit which produces a flow of steam to be condensed and the flow is urged by a vacuum.

In accordance with these and other objects which will become apparent hereinafter, the instant invention will be described with reference to the accompanying drawings in which:

DESCRIPTION OF THE DRAWINGS

FIG. 6 is a schematic similar to FIG. 5 but illustrating a heating circuit and its structure which is also described hereinafter.

FIG. 7 is a view in cross section illustrating a container, and a commercially available Peltier device which is utilized to simultaneously heat and cool liquid flowing in two separate paths through the container, one of which to be heated and one of which to be cooled.

DETAILED DESCRIPTION OF THE FIRST PREFERRED EMBODIMENT

The device is for use in desalinazation of sea water for example and is preferably of spherical form about 15 inches to 20 inches in diameter. Preferably, it is of the clear hard durable plastic material, such as Polycarbonate, which is commercially sold under the trademark LEXAN by the General Electric Company. The device or unit is sturdy, relatively small, inexpensive and disposable.

Figure 1:
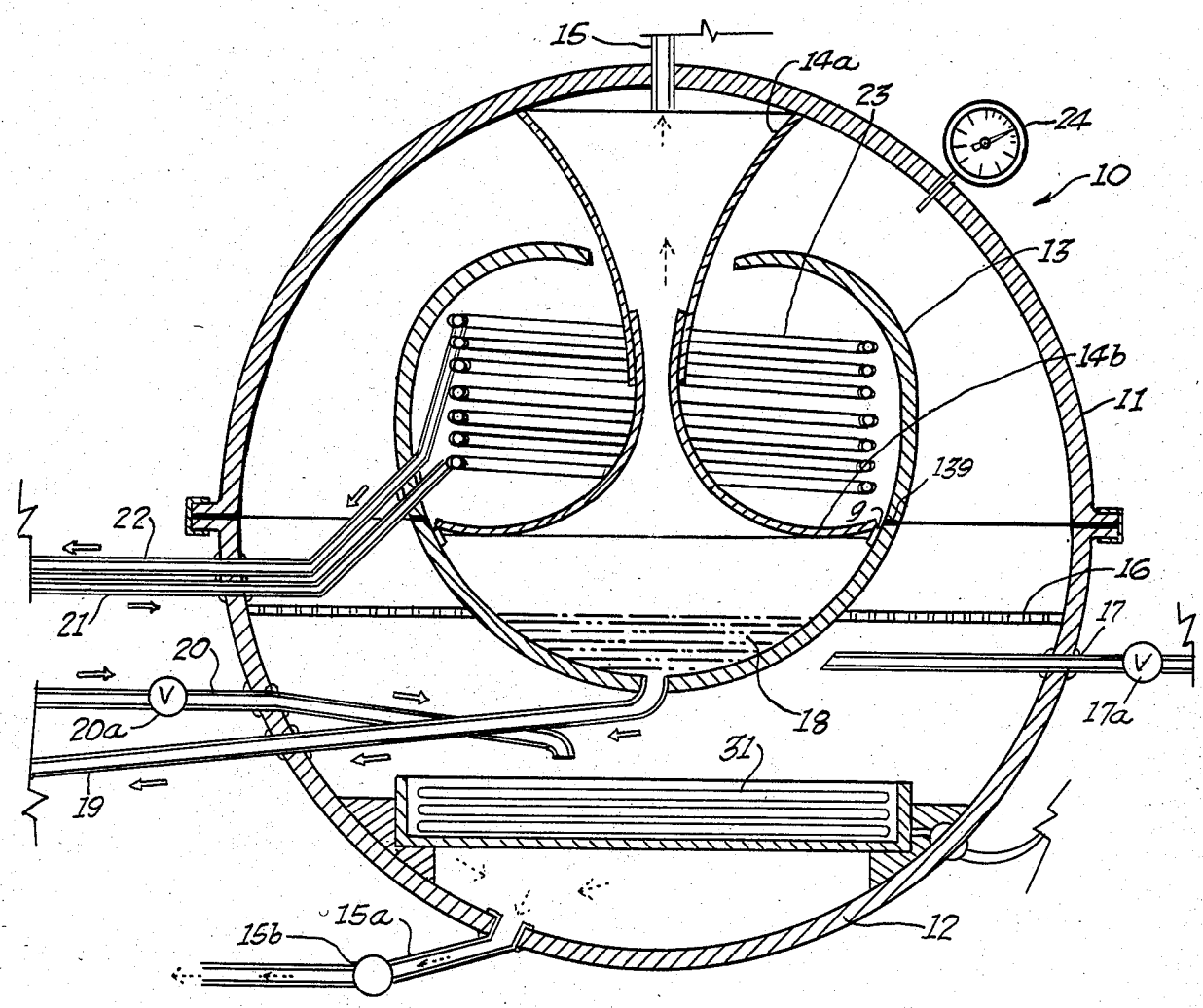
FIG. 1 is a view in cross section of an apparatus utilized in carrying out the process set forth and described more fully hereinafter.
Figure 2:
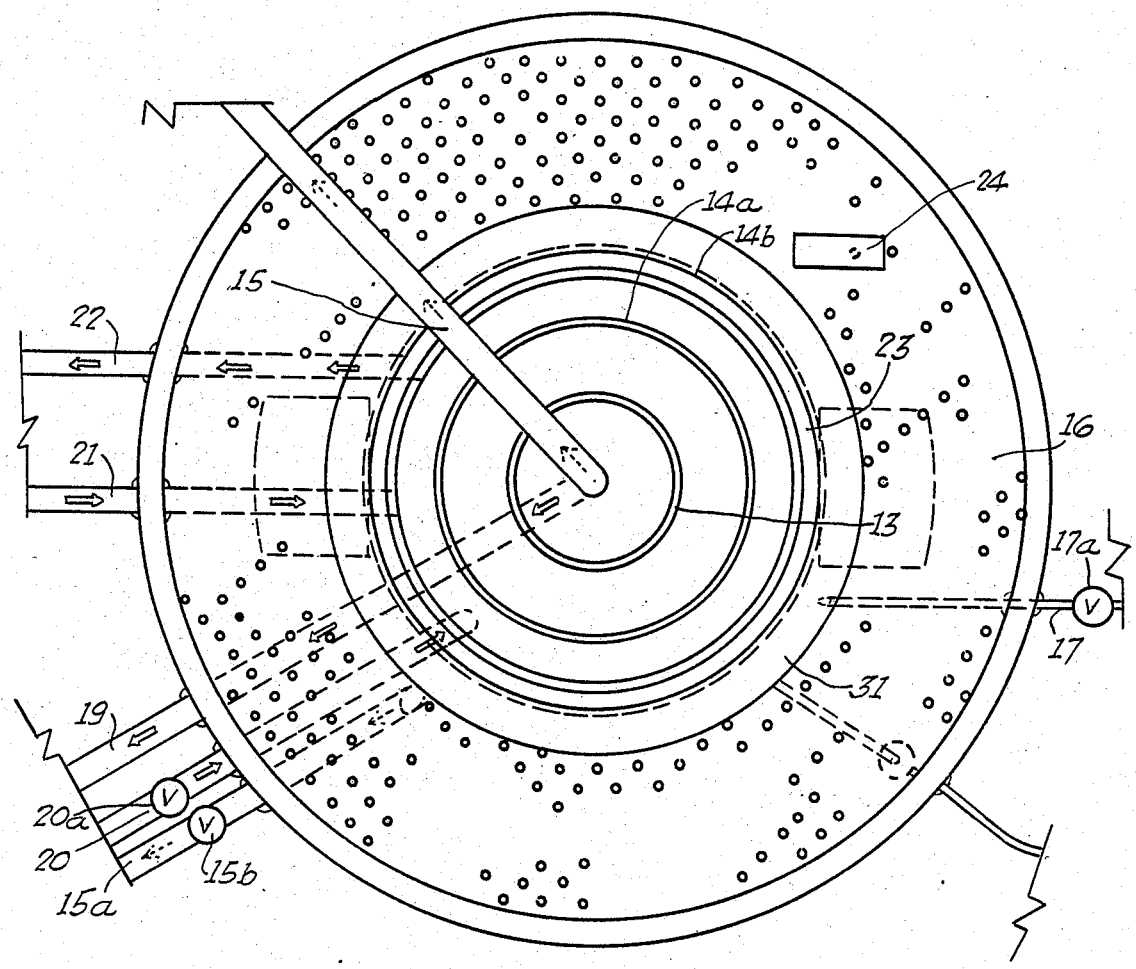
FIG. 2 is a plan view of the device shown in FIG. 1.
Figure 3:
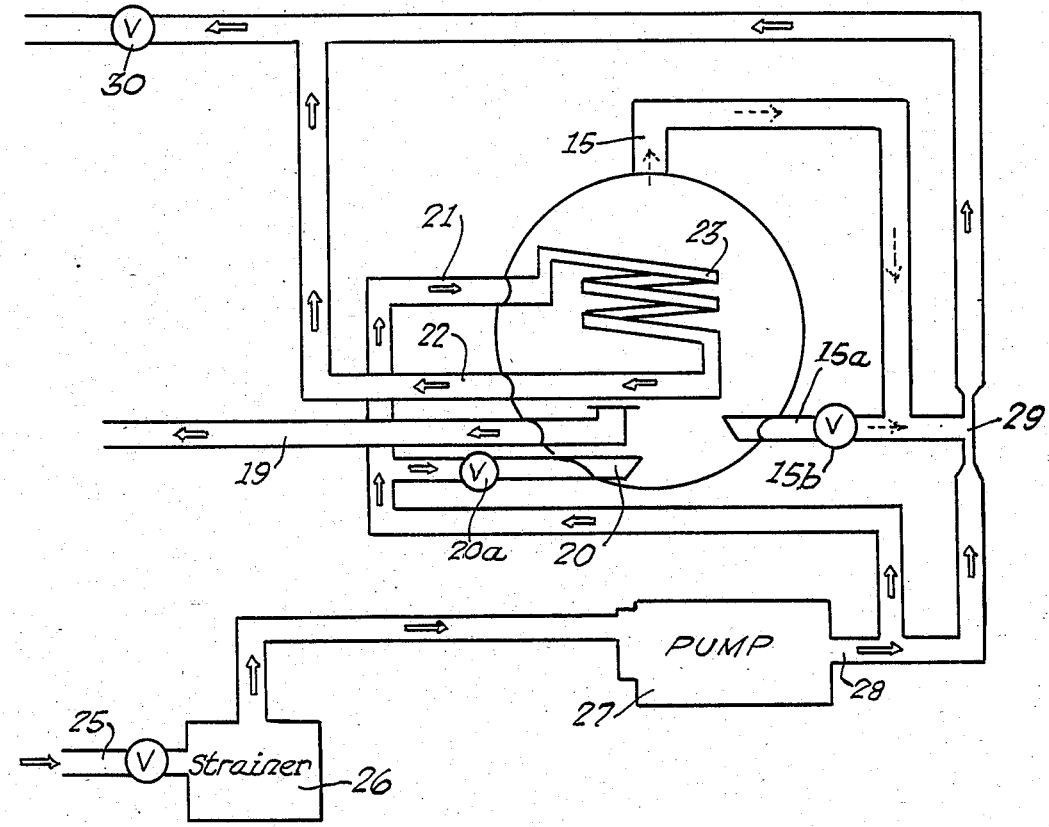
FIG. 3 is a schematic diagram illustrating the process which is achieved by the apparatus of FIGS. 1 and 2.

Referring to the first embodiment shown in FIGS. 1, 2 and 3, and, initially with particular reference to FIG. 3, there is shown, in schematic form, the distilling apparatus. It is seen that, at the lower left, sea water enters passing through a conduit and valve 25, strainer 26, and a pump 27. From the pump the sea water flows in two paths from the zone 28.

The first path is through a Venturi section 29, to a discharge adjacent the valve 30. By reason of the Venturi action, there is caused a reduction in pressure which is transmitted to the main chamber represented by the circled area in FIG. 3 and within the device generally 10 in FIG. 1. This vacuum or reduced pressure permits boiling of water in the chamber at a reduce temperature. The pressure reduction is communicated through two lines, line 15 to the top of the chamber and line 15a to the bottom of the chamber, the latter being controlled by the valve 15b.

The second flow path from the pump 27 and zone 28 delivers water to another pair of flow paths; first to a valve 20a and second to a conduit 21. The first flow path through the valve 20a controls flow into the container 10 which is the water to be distilled by the device. The other flow path includes a cooling coil designated by the numeral 23 which is within the container 10 and to which sea water is delivered through conduit 21 to be discharged as indicated through the valve 30.

In operation, the water flowing through the valve 20a is heated within the chamber by a suitable heater means, as will be explained on further reference to FIGS. 1 and 2, causing steam in the chamber which is constrained to flow as directed by guide structure and the reduced pressure in the chamber into heat exchanging relation with the coil 23 so that the steam is then cooled causing precipitate which is collected and discharged through the outflow line 19.

With further reference to FIG. 1, the structure will now be explained in more detail. The device or container generally indicated by the numeral 10 is preferably composed of a hard durable plastic having an upper half 11 and a lower half 12 which are secured together peripherally by suitable means, preferably by means of mating external flanges and bolts and wherein a Silicone gasket is captivated between the flanges to provide a seal.

Centrally arranged within the container 10 is a perforated spanning plate 16 preferably in the lower portion; and in the upper portion there is a precipitate or condensate collection bowl 13. Preferably, the bowl is in two portions, an upper portion and a lower portion, which are joined together suitably as at 139. Within the bowl there is provided a condensate flow guide for the precipitate. This guide preferably is also in two parts, an upper flow guide 14a and a lower flow guide 14b.

Referring to the lower left of FIG. 1, there is shown a water outflow pipe 15a which serves as a liquid level control means for the lower chamber of the container 10; and a valve 15b is provided in this line for selected control of removal of water and gas through the conduit 15a. By this means the level of the water to be converted to steam by the heater 31, to be described, is controlled.

In a preferred embodiment, the heater 31 is a coil to which electrical energy is supplied from a source as indicated at the lower right of FIG. 1. In an alternative embodiment, not shown in the drawings, within the lower portion of the chamber 10, engine heat from the manifold of a boat engine for example, may flow through a pattern of conduits for heat exchange with the water. In any event, heat is provided in the lower portion of the chamber to convert water into steam. By reason of this, the water supply entering from the left through the valve 20a and line 20 is discharged into the container where it is heated. A substantial portion of it is converted into steam which rises through a perforated plate 16 arranged and supported in spanning relation to the lower container half. The rising steam is guided by the sidewalls of the upper half of the container and the bowl and caused to flow into the zone between the bowl and the upper and lower inner flow guide 14a and 14b about the cooling coil 23 where the steam is condensed.

In doing so it is urged along the path by the reduced pressure or vacuum. To this end the conduit 15 under the influence of the Venturi 29 draws the flow in the direction of the arrows. Within the chamber, the steam condensate from the steam drips down to the lower collector zone of the bowl through a peripheral spill opening 9 to be collected as indicated at 18 in FIG. 1 where it is discharged through the line 19 in the direction of the arrows for whatever use is desired.

In the preferred embodiment, as seen at the right of FIG. 1, there is a vacuum release line 17 and control valve 17a which may be used to control the amount of vacuum within the container and, also, to create flow if desired from time-to-time. In the peferred embodiment, a gauge 24 is provided for sensing the vacuum available within the container.

In operation, water is caused to be distilled by first changing it into steam by the heater means 31 in a vacuum chamber so that the normal temperature at which is boils in atmospheric conditions is reduced. The resulting steam is caused to flow in a predetermined pattern about cooling coils so that precipitate is collected and discharged through the conduit 19. In the preferred embodiment, the container 10 composed of the upper and lower halves 11 and 12 and the other parts are preferably of a hard durable plastic such as polycarbonate which is known commercially as LEXAN, a commercially available product sold under that trademark which is of the General Electric Corporation.

DESCRIPTION OF THE SECOND PREFERRED EMBODIMENT

Figure 4:
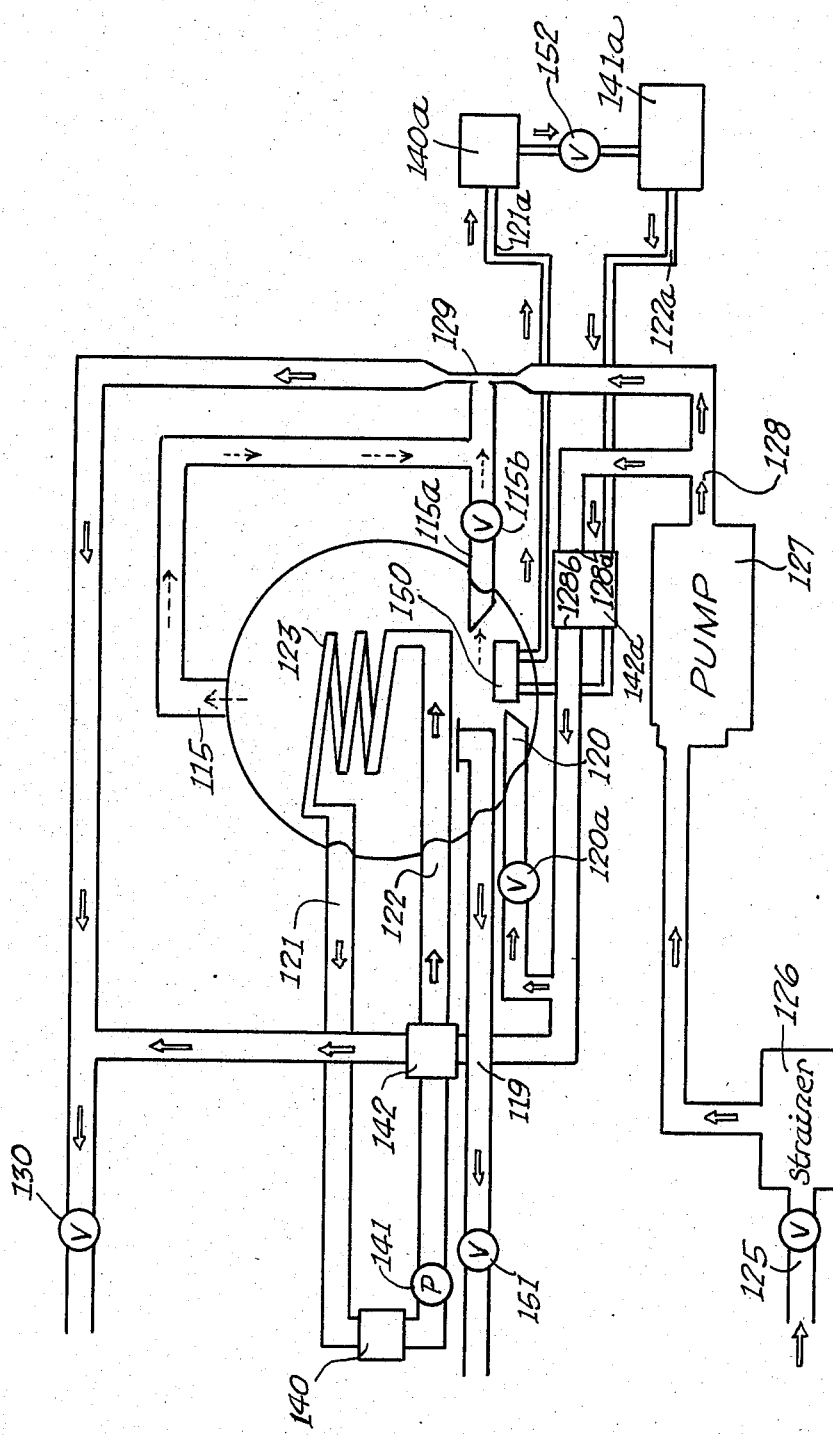
FIG. 4 is a schematic diagram of a second alternative embodiment illustrating an alternative process which utilizes the same equipment illustrated in FIG. 1, with the exception of a heating and a cooling circuit which are to be described more fully hereinafter.

Referring to FIG. 4, there is shown an alternative embodiment of the invention. The structure is similar to that of FIG. 1 in most respects. It includes an intake through the line and valve 125, strainer 126 and pump 127 through the pump discharge line 128 and then along two paths, the path through the Venturi 129 to the discharge valve 130 which causes the vacuum in the container by the line 115a and 115 as controlled by the valve 115b. This vacuum causes the vacuum within the main container and a lowered boiling temperature. The other component of flow is along a path from the pump discharge 128 through the discharge 120 as controlled by valve 120a, into the container for water to be heated while the other component flows through the valve 130 to be discharged. The distilled water is collected in pipe 119 with flow being controlled by valve 151. The difference in this embodiment from that previously described is that at the lower right there is provided an improved heating circuit to be described hereinafter and at the upper left an improved cooling circuit for the coil 123 to be described hereinafter.

In the heating circuit and in the cooling circuit there is a thermo-electric (Peltier) heat pump.

Before describing the heater and cooling circuits, reference is made to the location of a thermo-electric (Peltier) heat pump, see FIG. 4 in which one is designated by the numeral 142. This is a cooling circuit. It includes the conduit 122, a pump 141 and reservoir 140. The other Peltier device is designated by the numeral 142a and it is in the heating circuit. This circuit includes the conduit 121a, pump 141a, reservoir 140a, and valve 152.

In general, Peltier devices are capable of refrigerating a fluid object thereby bringing down the temperature. It is unlike conventional vapor compressor systems in that thermo-electric units are utilized which are small, solid state devices. A typical unit measures $1'' \times 1'' \times \frac{1}{4}''$ thick. These units as is well known in the field are capable of reducing the temperature of flowing liquid to well below freezing. Peltier devices are available commercially from the Melcor Company of 990 Spruce Street, Trenton, N.J. 08648. The Peltier device consists of a first and second plate sandwiched about an electronic circuit. One is illustrated in FIG. 7 in which one chromatic plate is designated by the numeral 151 and the other by the numeral 161 while the sandwiched circuit is served by a positive lead 153 and a negative lead 154, see FIG. 6.

Referring now to FIG. 6, this illustrates the heating circuit at the right in FIG. 4. The incoming relatively cool sea water, which, however, contains some heat, flows under the influence of pump 127 to the Peltier device 142a. The Peltier device removes heat from the sea water and transfers the heat to boil the water in the steam chamber by the heat coil 150. It does this by transferring the heat to an anti-freeze type material, such as ethylene glycol, which is flowing in the heating circuit under the influence of the pump 141a. The sea water enters the Peltier device container 142a of the heating circuit, see FIG. 6, as at 128a exiting at the right 128b in a continuous flow to cause heat to be taken from the entering sea water. This water passes through the container shown in FIG. 6. As best seen in FIG. 7, within this container the Peltier devices are provided and the plates 151 and 161 are also provided. Referring to FIG. 7, it is seen that the Peltier device is composed of two plates 151 and 161 sandwiching an electrical network therebetween with a positive lead 153 and negative lead 154, the latter being shown in FIG. 6. These are operated on 12 volts so as not to have high energy requirements. The anti-freeze is caused to flow by the pump 141a through the container in a serpentine path in heat exchanging relation with the sea water, see FIG. 4, through the line 122a and the Peltier device 142a and line 121a to cause the ehater coil 150 in the main chamber to become hot with the flow of the hot anti-freeze passing through the line 121a to the reservoir 140a conveniently located in the circuit, preferably adjacent the control valve 152. The heat is obtained through the Peltier device and extracted from the water which flows through the heater 150. In a preferred embodiment, the coils are surrounded by foam insulation material, as indicated by the numeral 170 for heat efficiency. Brass plates 152a and 162a form part of the container of the Peltier device of FIG. 7 and are in heat exchanging relation with the Peltier device and on the one side with sea water and on the other with the heat exchanging fluid.

Figure 5:
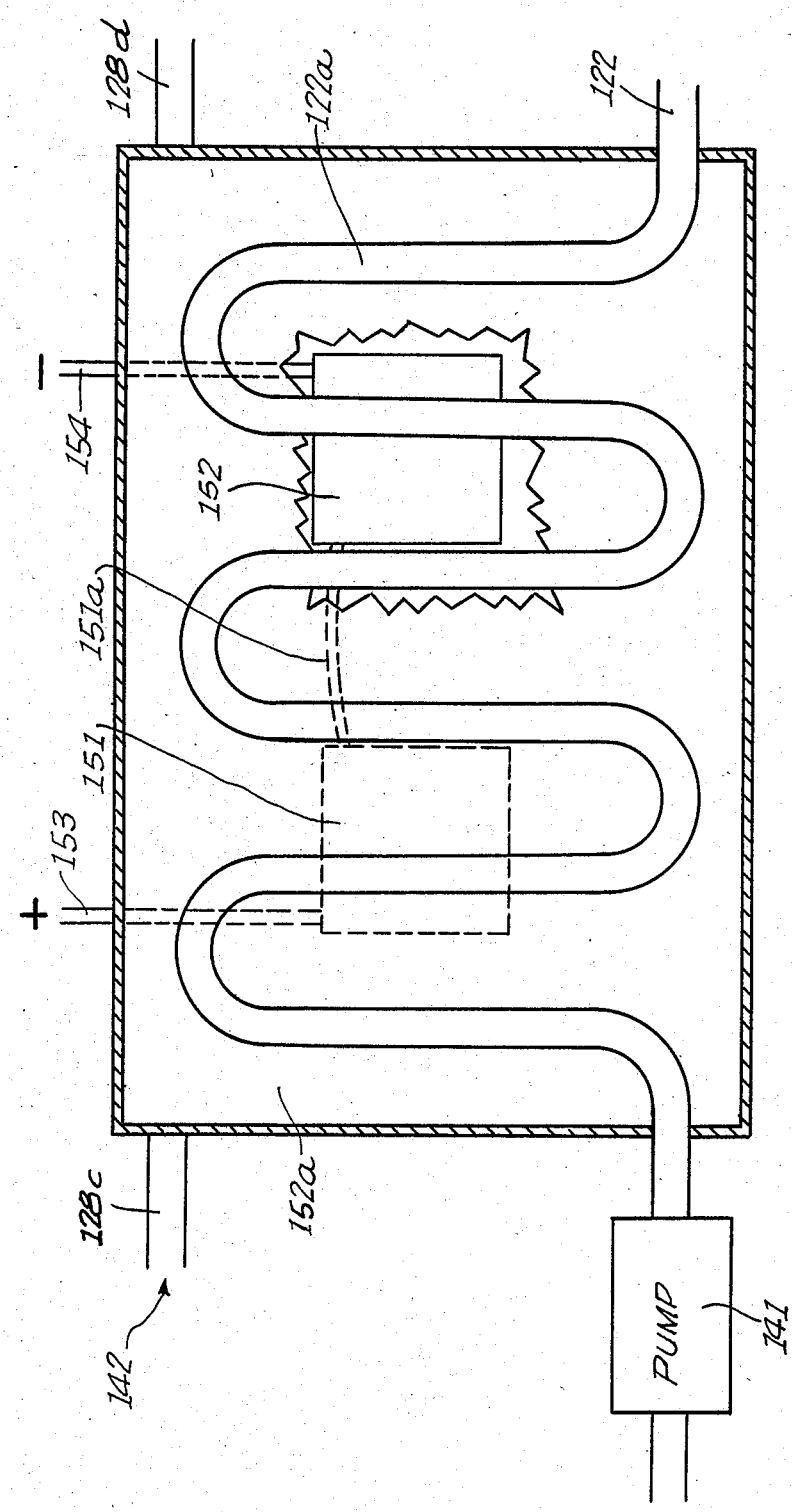
FIG. 5 is a schematic diagram illustrating the cooling circuit and its structure as is described more fully hereinafter.

Referring now to FIG. 5, a device similar to that previously described on reference to FIGS. 6 and 7 is utilized in the cooling system at the left in FIG. 4. The cooling circuit has the pump designated by the numeral 141, and the reservoir by the numeral 140, and the Peltier device being generally indicated by the numeral 142 in FIG. 4. In the Peltier device or heat exchanging device, serpentine coils 123 are provided for the anti-freeze of the circuit 122 to flow through the device. Preferably there are two Peltier devices 151 and 152 (FIG. 5) which operate as previously described under the influence of electric current. Positive indicated at 153 and negative indicated at 154. The water is cooled flowing to the coil 123 with the heat which is picked up from the heat exchanging means in the circuit, 121, 122, and 123 and transferred by the Peltier device to the sea water entering and exiting through the entrance and exit ports indicated by the numeral 128c at the left and 128d at the right of FIG. 5. The anti-freeze material to be operated on by the influence of the Peltier device is shown to flow to the device as indicated by the serpentine conduit 122a.

It is thus seen that the device shown in FIG. 1 has been modified in the embodiment of FIGS. 4, 5 and 6 in that the heating circuit and a cooling circuit are utilized, first, to heat the water which is utilized in the container to cause steam and, additionally, the other Peltier device is utilized to cool the water flowing in the condenser coil 123, thereby increasing the efficiency of the device and constituting a second preferred and improved embodiment.

While the instant invention has been shown and described in what is conceived to be a practical and preferred embodiment, it is recognized that departures may be made therefrom within the spirit of this invention which is therefore not to be limited except as set forth in the claims hereinafter and with the doctrine of equivalents.

What is claimed is:
1. A desalinization device comprising,
(a) a main tank having a substantially closed configuration and including an upper zone and a lower zone,
(b) a condensate collector bowl supported within said tank and having an open upper end, a wall and a floor, said open upper end communicating with an interior of said tank and being disposed in said upper zone thereof,
(c) a cooling coil disposed within said bowl and formed of tubular material structured to allow cooling water to pass therethrough,
(d) heater means disposed in said lower zone and means to introduce water into said lower zone to be heated and thereby converted into steam,
(e) guide means for guiding steam into interruptive engagement with said cooling coil for condensation thereof,
(f) said guide means extending through said cooling coil and comprising a lower flow guide disposed on the interior of said bowl and protruding outwardly from a lower end of said cooling coil,
(g) said guide means further comprising an upper flow guide extending outwardly from an upper end of said cooling coil and through said open end of said bowl into said upper zone of said tank,
(h) said tank, bowl and guide means cooperatively structured to define a path of fluid flow of steam from said lower zone of said tank to said cooling coil,
(i) said path of fluid flow successively comprising an interior wall surface of said tank, an exterior surface of said bowl wall and an exterior surface of said upper flow guide; and interior surface of said bowl wall and exterior surfaces of both said upper and said lower flow guides,
(j) a condensate passage disposed adjacent to a peripheral edge of said lower flow guide and between said peripheral edge and the interior surface of said bowl wall, said condensate passage structured to allow flow therethrough of condensate to said bowl floor,
(k) means to produce a vacuum for reducing the pressure in the tank thereby reducing the temperature required to convert heated water in the lower zone into steam and to urge steam flow along said path of fluid flow, said tank having an exit port above said open bowl end to communicate steam flow from the bowl in the tank, a first conduit means including valve means to control flow through the device of water being heated and converted into steam and water to flow through said cooling coil, said first conduit means including regulator valves.

2. A device as in claim 1 wherein said first conduit means further comprises a Venturi means for creating a vacuum within said tank and formed within said first conduit means, said Venturi means disposed in fluid communication with said lower zone of said tank and said bowl through said exit port, whereby a vacuum is established within said tank at both locations.

3. The device as set forth in claim 1 wherein said heater means comprises a Peltier device for heating the water to be converted into steam.

4. The device as set forth in claim 1 wherein a second conduit means are provided interconnecting said cooling coil with said first mentioned conduit means and including a heating coil circuit comprising a Peltier device to cool water flow in the cooling coil.

5. The device as set forth in claim 1 wherein a perforated floor is provided in the lower zone of said tank separating said lower zone into an upper portion and a lower portion.

6. The device as set forth in claim 5 wherein said bowl includes an upper segment and a lower segment, said lower segment being supported by said perforated floor in said tank.

7. The device as set forth in claim 1 wherein a gauge for determining pressure in the tank is provided in the upper zone of said tank in open communication with the interior of the tank.

8. The device as set forth in claim 1 wherein drain means are provided in the lower zone of said tank for conducting water therefrom which is not converted into steam.

* * * * *